Feb. 7, 1950        P. R. ALEXANDER        2,496,840
SPORTSMAN'S KNIFE
Filed April 16, 1948
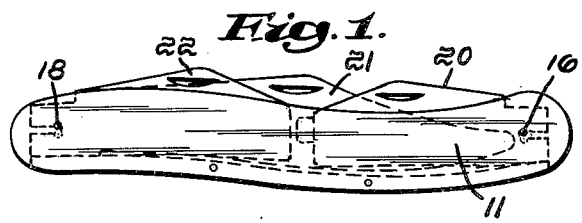
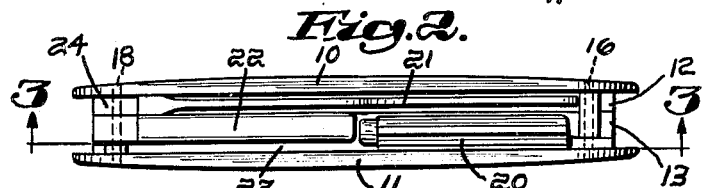
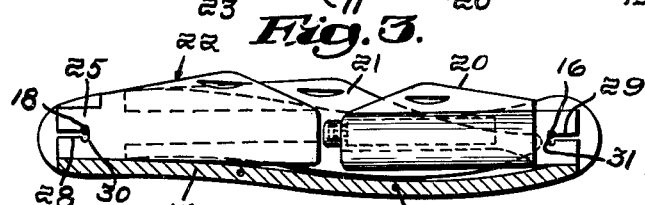
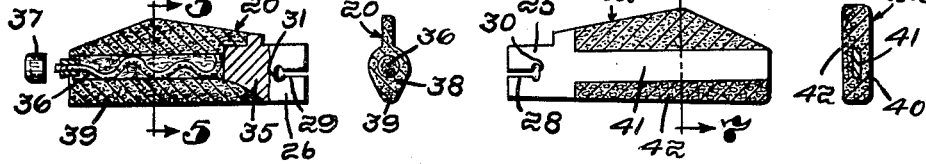
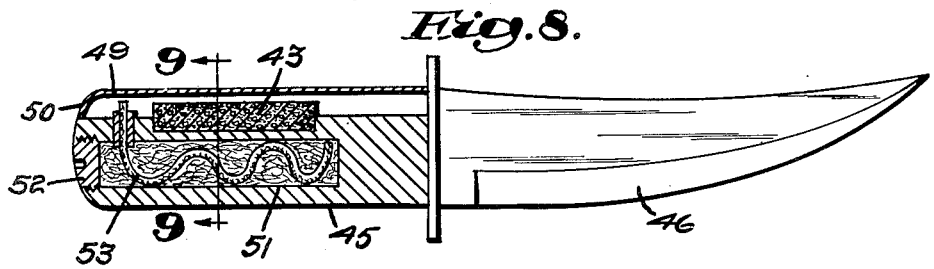
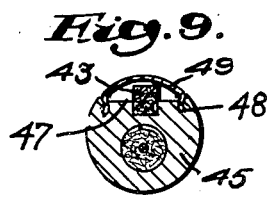
Inventor:
Paul R. Alexander
by J. Harold Bose
Attorney Patented Feb. 7, 1950

2,496,840

UNITED STATES PATENT OFFICE 2,496,840

SPORTSMAN'S KNIFE

Paul R. Alexander, Saugus, Mass.

Application April 16, 1948, Serial No. 21,383

2 Claims. (Cl. 67—7.1)

The present invention relates to devices useful to sportsmen, boy scouts, etc., such as a sportsman's knife, and more particularly to a device useful for igniting fires.

Sportsmen, such as hunters and fishermen, usually carry matches for igniting fires for cooking meals. If the matches become wet they are useless. If they are lost or forgotten no means is available for igniting a fire. Boy scouts sometimes carry flint rocks but these are heavy and often are unsatisfactory.

A sportsman's knife is used in common by sportsmen of all types because it is useful for such a large variety of purposes. It is a large jack knife having a large cutting blade and a small cutting blade. The small cutting blade is seldom used and is not essential either to most sportsmen or to boy scouts.

The present invention is based in part upon the idea that since the small blade of a sportsman's knife seldom is used, a more useful device may be provided by replacing the small blade by a member which has a pyrophoric alloy portion and is particularly suitable for igniting fires. Thus, the invention not only adds utility to a sportsman's knife but also makes available to sportsmen of all types a means for igniting fires without adding any additional piece of equipment. If the pyrophoric material becomes wet, as by accidentally dropping the article in water, its ability to produce sparks is not affected.

The pyrophoric alloy preferably is an alloy of zirconium with lead but may be any pyrophoric alloy, such as an alloy of cerium with iron, which produces sparks or a flame when rubbed with another hard object. The member or blade containing it may be formed in any desired manner as by molding pieces of the pyrophoric alloy with a suitable binder, such as Bakelite or other synthetic resin. An additional material may be incorporated which is adapted to be ignited by the sparks to produce a flame. For example, a metal hydride may be mixed with the pieces of pyrophoric material before molding or the pieces of pyrophoric material may be coated with a hydrocarbon or other inflammable material which is trapped in the article during molding. When a blade containing a hydride is rubbed with another hard object, the small particles of the hydride removed are decomposed to produce gaseous hydrogen which is ignited by the pyrophoric sparks. Similarly, trapped portions of an inflammable material, such as a hydrocarbon, are exposed either in liquid or gaseous form to the pyrophoric sparks and ignited when the blade is rubbed with another hard object.

The invention will be more fully understood from the following description in conjunction with the accompanying drawing, in which:

Fig. 1 is a plan view of a sportsman's knife embodying the invention;

Fig. 2 is an elevational view of the same;

Fig. 3 is a sectional view taken on the line 3—3 of Fig. 2;

Fig. 4 is a longitudinal sectional elevational view of one of the parts;

Fig. 5 is a sectional view taken on the line 5—5 of Fig. 4;

Fig. 6 is a longitudinal sectional elevational view of another of the parts;

Fig. 7 is a sectional view taken on the line 7—7 of Fig. 6;

Fig. 8 is a view of a modified form of sportsman's knife; and

Fig. 9 is a sectional view taken on the line 9—9 of Fig. 8.

One embodiment of the invention as illustrated in Figs. 1 to 7 of the accompanying drawing comprises a narrow elongated body B having spaced longitudinal walls 10 and 11. Three spring steel members 12, 13 and 14 are positioned between the walls 10 and 11. A pair of rivets 15 pass through the walls 10 and 11 and each of the spring members 12, 13 and 14 intermediate their ends. A rivet 16 passes through one end portion of the walls 10 and 11 and serves as a pivotal support for a member 20. A rivet 18 passes through the opposite end portion of the walls 10 and 11 and serves as a pivotal support for a knife blade 21 and a member 22. One end portion of each of the spring members 12 and 13 extends past the rivet 18 and is adapted to engage the cam-like end portions 24 and 25 of the blade 21 and member 22 respectively to hold them either in a position within the chamber 23 provided by the walls 10 and 11 or in a position outside the chamber. One end portion of the spring member 14 extends past the rivet 16 and engages the cam-like end portion 26 of the member 20 to hold it either in a position within the chamber 23 or in a position outside the chamber. It will be understood that the members 20 and 22 and the blade 21 are held yieldably in said positions by engagement of the spring members 12, 13 and 14 with the flat portions of the cam-like end portions 26, 25 and 24 of the members 20 and 22 and the blade 21 respectively. The end portion 24 of the knife blade 21 is provided with a cylindrical hole serving as a bearing rotatably engaging the rivet 18. The end portions 25 and 26 of the members 22 and 20 are provided with longitudinal slots 28 and 29 respectively extending to the cylindrical cavities 30 and 31 respectively, the latter serving as bearings rotatably engaging the rivets 18 and 16 respectively. The slots 28 and 29 permit either of the members 20 and 22 to be detached from the body B when the members are positioned perpendicular to the body for the purpose described hereinafter.

The member 20 comprises a piece 35 of strong tough material, such as brass or steel, providing the cam-like end portion 26. The other end of the piece 35 is formed with a cavity 36 to receive an absorbent wick and an inflammable liquid. The open end of the cavity 36 normally is closed by a closure member 37. The piece 35 serves as a reinforcing member for the molded synthetic resin, such as Bakelite, forming the main body 38 of the member 20. The surface of the body 38 is essentially a pyrophoric alloy, such as an alloy of cerium with iron or zirconium with lead, preferably in the form of small pieces 39 held in the resin binder.

The member 22 comprises a body 40 of synthetic resin reinforced by a flat strip 41 of steel. One surface and one edge of the body is essentially a pyrophoric alloy, preferably in the form of small pieces 42 held in a synthetic resin binder. Before molding, the pieces of pyrophoric alloy may be mixed with a metal hydride, such as zirconium hydride, titanium hydride, etc., or they may be coated with an inflammable material, such as a hydrocarbon.

When it is desired to ignite wood or the like for a fire, the member 22 may be turned from its position within the chamber 23 to a perpendicular position and removed from the body B. The knife blade 21 may then be turned to a position outside the chamber 23 and the blunt edge of the blade rubbed against the surface of the member 22 to produce sparks. The temperature of the sparks thus produced tends to decompose any particles of metal hydride to form hydrogen which is ignited to form a flame. Similarly, any coating of an inflammable material on the sparking particles of pyrophoric alloy removed by the rubbing action may be ignited to form a flame.

Similarly, the member 20 may be removed from the body B. The closure 37 then may be removed to expose the wick which is saturated with an inflammable liquid. When the surface of the member 20 is rubbed with the blunt edge of the blade 21, the sparks produced ignite the inflammable liquid carried by the wick and the flame may be used to ignite a fire.

The blunt edge portion of the knife blade 21 may be formed of a very hard material such as tungsten carbide particles embedded in a matrix or binder of about 11 per cent nickel or cobalt. This is particularly desirable when the pyrophoric alloy used in members 20 or 22 is an alloy of cerium with iron.

Another type of sportsman's knife embodying the invention is illustrated in Figs. 8 and 9 and comprises a handle portion 45 of molded synthetic resin and a blade portion 46. The handle portion is of general cylindrical form cut away to provide a flat surface 47. A strip of a pyrophoric alloy 43 is embedded in the synthetic resin to project above the surface 47. The surface 47 is provided with grooves 48 to receive slidably the depending edges of a closure member 49 which is adapted to cover the strip of pyrophoric alloy when not in use and complete the general contour of the handle portion 45. The closure member 49 is provided with a down turned rear end portion 50 adapted to engage the flat surface 47. The handle portion 45 may be provided with a cavity 51 to receive a wick and an inflammable liquid. The inflammable liquid may be introduced through an opening which is normally closed by a plug 52. The wick 53 extends through an opening in the flat surface 47 to a point adjacent one end of the strip 43 of pyrophoric alloy.

I claim:

1. In a sportsman's knife comprising a narrow elongated body serving as a handle, a pair of blade members pivotally carried by the handle for movement between an operative position outside said body and an inoperative position within said body, a resilient member associated with each of said blade members and adapted to hold the latter in said positions, and means permitting one of said blade members to be detached from said body, the improvement wherein at least a portion of one of said blade members is a pyrophoric material whereby the detachable member when removed from said body may be rubbed against the other blade member to produce sparks.

2. In a sportsman's knife comprising a narrow elongated body serving as a handle, a pair of blade members pivotally carried by the handle for movement between an operative position outside said body and an inoperative position within said body, a resilient member associated with each of said blade members and adapted to hold the latter in said positions, and means permitting one of said blade members to be detached from said body, the improvement wherein at least a portion of one of said blade members is a pyrophoric material whereby the detachable member when removed from said body may be rubbed against the other blade member to produce sparks, said means being arranged to permit the detachable member to be removed from said body only when located intermediate said positions.

PAUL R. ALEXANDER.

REFERENCES CITED

The following references are of record in the file of this patent:

UNITED STATES PATENTS

| Number | Name | Date |
|---|---|---|
| 586,453 | Normand | July 13, 1897 |

FOREIGN PATENTS

| Number | Country | Date |
|---|---|---|
| 53,127 | Austria | Apr. 25, 1912 |
| 240,530 | Germany | Nov. 6, 1911 |
| 428,962 | Germany | May 15, 1926 |